United States Patent [19]
Smith

[11] Patent Number: 5,748,270
[45] Date of Patent: May 5, 1998

[54] LCD WITH ELECTROLUMINESCENT BACKLIGHTING

[75] Inventor: Dwight D. Smith, Lynchburg, Va.

[73] Assignee: Ericsson, Inc., Research Triangle Park, N.C.

[21] Appl. No.: 668,472

[22] Filed: Jun. 25, 1996

[51] Int. Cl.⁶ .................. G02F 1/1333; G02F 1/1345
[52] U.S. Cl. .................. 349/69; 349/59; 349/149
[58] Field of Search .................. 349/58, 60, 69, 349/59, 149

[56] References Cited

U.S. PATENT DOCUMENTS

| | | | |
|---|---|---|---|
| 5,121,234 | 6/1992 | Kucera | 349/69 |
| 5,146,390 | 9/1992 | Wong | 349/60 |
| 5,243,453 | 9/1993 | Kawaguchi et al. | 349/60 |

FOREIGN PATENT DOCUMENTS

| | | | |
|---|---|---|---|
| 404263220 | 9/1992 | Japan | 349/60 |
| 7333639 | 12/1995 | Japan | 349/69 |

Primary Examiner—William L. Sikes
Assistant Examiner—Julie Ngo
Attorney, Agent, or Firm—Nixon & Vanderhye P.C.

[57] ABSTRACT

An LCD assembly is disclosed. The LCD assembly includes a frame housing an LCD material layered on an electroluminescent material layered on a circuit board. One side of the circuit board includes elastomeric connectors to connect to, respectively, the LCD material and the electroluminescent material on the other side of the circuit board, a third elastomeric connector attaches to the main circuit board of a consumer product.

12 Claims, 5 Drawing Sheets

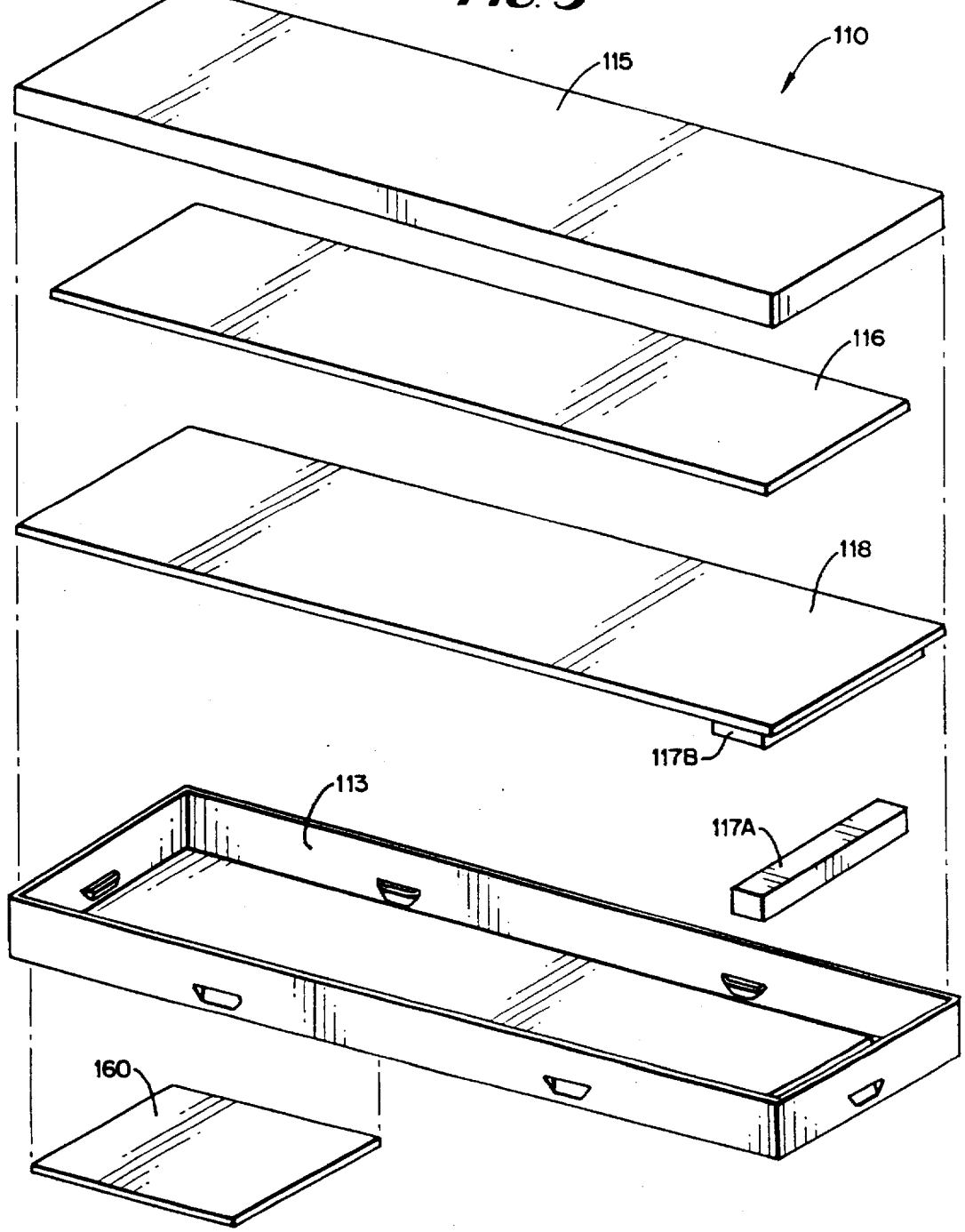

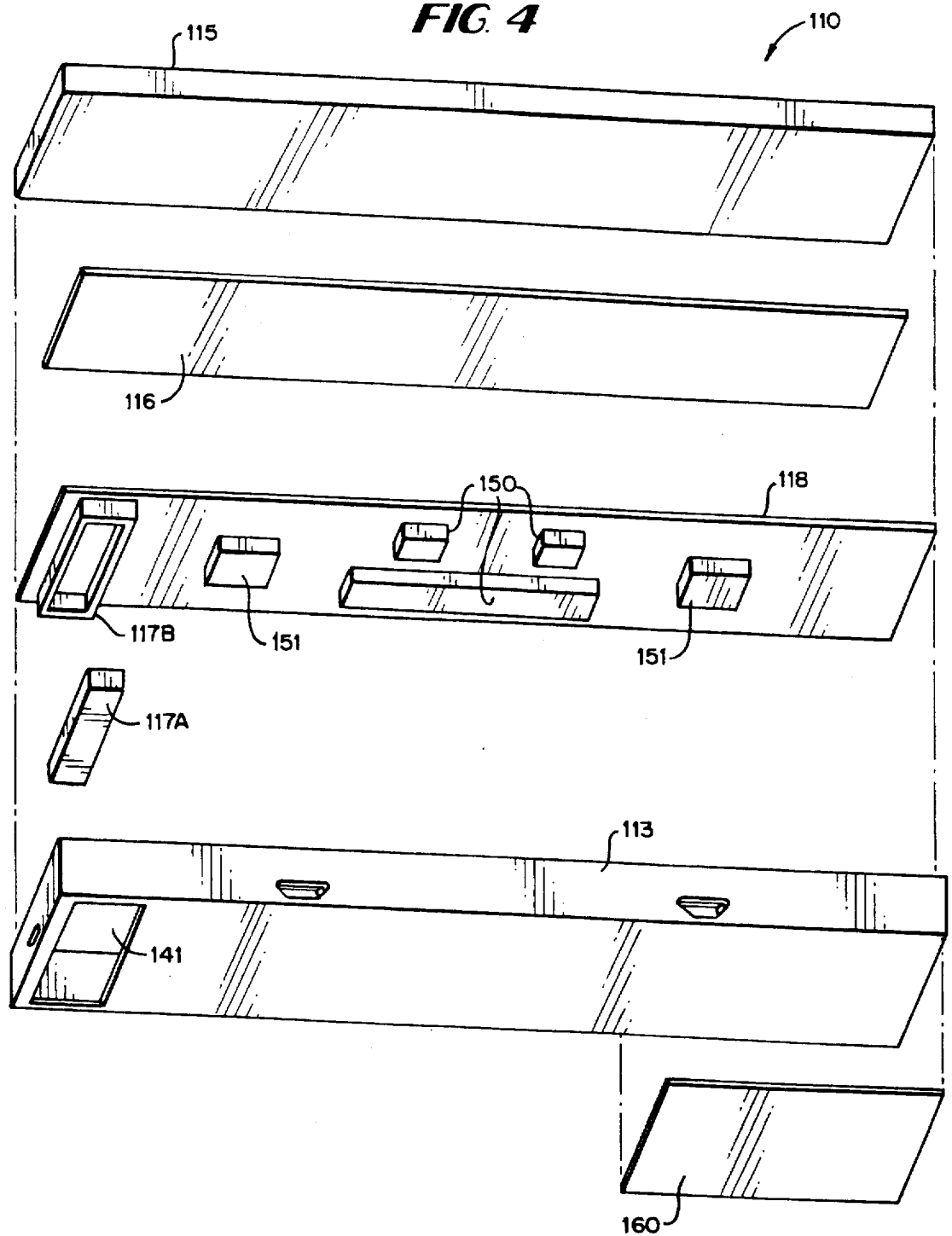

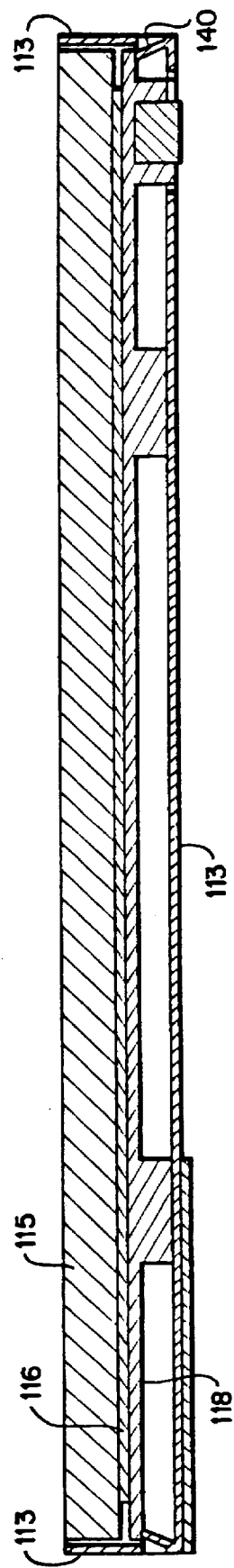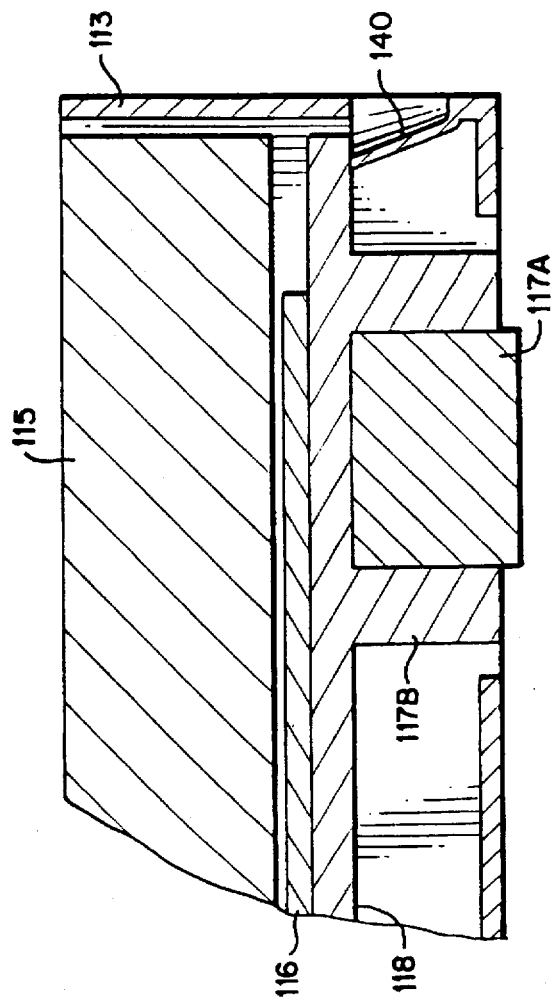

LCD WITH ELECTROLUMINESCENT BACKLIGHTING

FIELD OF THE INVENTION

This invention relates to LCDs, and more particularly, to LCD assemblies with electroluminescent backlighting.

BACKGROUND OF THE INVENTION

Liquid Crystal Displays (LCDs) are well-known and popular display devices used in many electronic consumer products, such as pagers, calculators, watches, television screens, etc. In some devices, such as in pagers, LCDs can be subject to some physical abuse and wear. For this reason, LCDs are usually employed behind a protective cover to prevent the LCD from impact and exposure.

As is by now well known, the LCDs work by applying electronic signals to a matrix of conductors connected to the LCD structure. By applying signals to particular x- and y- coordinates on the LCD matrix, different portions of the display are darkened, thus producing symbols, numbers, letters or characters to the viewer. To control how the signals are applied to the particular coordinates, the LCDs are electronically driven by an LCD driver, usually located on a driver board. The driver board is part of the total LCD assembly, which typically includes the LCD, the driver board, and a lens over the LCD, all housed in the protective cover.

The LCD must, of course, be in electrical communication with the driver board in order to receive the x- and y- matrix signals. To accomplish this, prior LCD assemblies employed solder connections between the LCD and the driver board. Alternatively, LCD assemblies used jumpers, such as pin and socket connections to get the matrix signals from the driver board to the LCD. The driver board, in turn, was also connected to the remaining circuitry of the consumer product (the pager, calculator, etc.) with solder or jumpers in order to receive, among other signals, its control signals and electronic power.

The LCD is usually physically attached to the driver board, which is physically attached to the protective cover. The cover and/or the driver board are then attached to the product to make the LCD assembly a device that is integral with the product as a whole.

LCD assemblies are usually back-lit by LEDs or light-guides located on the main circuit board of the consumer product. LCD assemblies are usually custom products designed to accommodate the particular back-lighting arrangement provided by the consumer product to which the LCD will ultimately be assembled.

Another form of display device is an electroluminescent display. Electroluminescent displays typically include a layer of electroluminescent material that emits light when subjected to a high electric field. Electroluminescent displays are driven by drivers that control the electrical stimulation of the electroluminescent material.

When an LCD or an electroluminescent display are assembled with their driver boards into a display assembly, electrical connections are made from the LCD to its driver or from the electroluminescent material to its driver. Additional electrical connections must be made from the driver board to the main circuitry of the consumer product to which the display is attached. Solder leads are usually designed onto the consumer product circuit board to accept the electrical connection from the display assembly. The assembly of such a display device involves intricate maneuvering to complete the complicated coordination of physical and electrical connections, both within the display device and between the display device and the main circuit board. Improvements in manufacturing efficiency are always desirable in producing such display assemblies.

SUMMARY OF THE INVENTION

The present invention provides an improved LCD structure and significantly improves the efficiency of manufacturing LCD devices by eliminating solder connections between the LCD and its drivers, and also between the LCD assembly and the main circuit board. The present invention achieves these efficiencies with an LCD assembly that can be made relatively large, has its own backlighting, and provides shielding from external radio components. According to one embodiment, an electroluminescent material is sandwiched between an LCD material and a driver board, with conductive tape providing a solderless connection for power to the panel. Elastomeric connections are also made between the main circuit board and the LCD assembly.

This LCD assembly is manufactured by layering various components on top of each other and then connecting them all physically and electrically by compressing and holding the layers together with screws. The screws secure the layers for physical integrity. Also, the compression from the screws causes elastomeric conductive connectors to compress within the layers to create the necessary electrical conductivity between the layers.

The manufacturing operation is greatly simplified. The LCD assembly is placed into and retained by a front cover. The frame is metal and provides a structure within which the LCD material, the electroluminescent material, and the driver board are arranged. The frame provides extra protection for the LCD assembly against impact damage and shields the LCD and electroluminescent display drivers from other radio circuits.

All electrical connections within the above assembly are made by compressive silicone conductive strips. No solder is required, nor is any access to the boards required to complete electrical conductivity. When the layers are inserted into the frame, in the layers described above, and the driver board and frame are screwed down to the front cover, the compression of the components causes the compressive silicone conductive strips to complete the necessary electrical connections automatically as the screws are tightened down.

Finally, an additional elastomeric connection provides electrical conductivity between the LCD assembly and the main circuit board of the consumer product.

The present invention vastly improves manufacturing time and increases the ease of assembling LCD devices for consumer products by eliminating soldering and jumpering between the component layers and eliminating soldering and jumpering between the LCD assembly and the main circuit board of the consumer product. In addition, the present invention allows a more closely enveloping (and hence more protective) frame to be used around the various components of the LCD assembly since the frame does not need to maintain access to the components and boards in order to complete electrical connections between the various components. That is, since electrical connections occur automatically as the layers are screwed down to each other, access is not required to make the electrical connection and the frame can then be designed without access requirements in mind.

In addition, the present LCD assembly can now be used as a universal component in a variety of different consumer products since the LCD assembly includes its own backlighting and thus does not need to be customized to accommodate the particular backlighting provided by the consumer product.

BRIEF DESCRIPTION OF THE DRAWINGS

The purpose and advantages gained by the present invention will be understood by careful study of the following detailed description of the presently preferred embodiment with particular reference to the accompanying drawings.

FIG. 3 is an exploded perspective view of a detailed example embodiment of the present invention;

FIG. 4 is another exploded perspective view of the embodiment of FIG. 3;

FIG. 5 is a cut-away orthogonal view of the embodiment of FIG. 3; and

FIG. 6 is a detail cut-away of one section of the embodiment shown in FIG. 5.

DETAILED DESCRIPTION OF THE DRAWINGS

Figure 1:
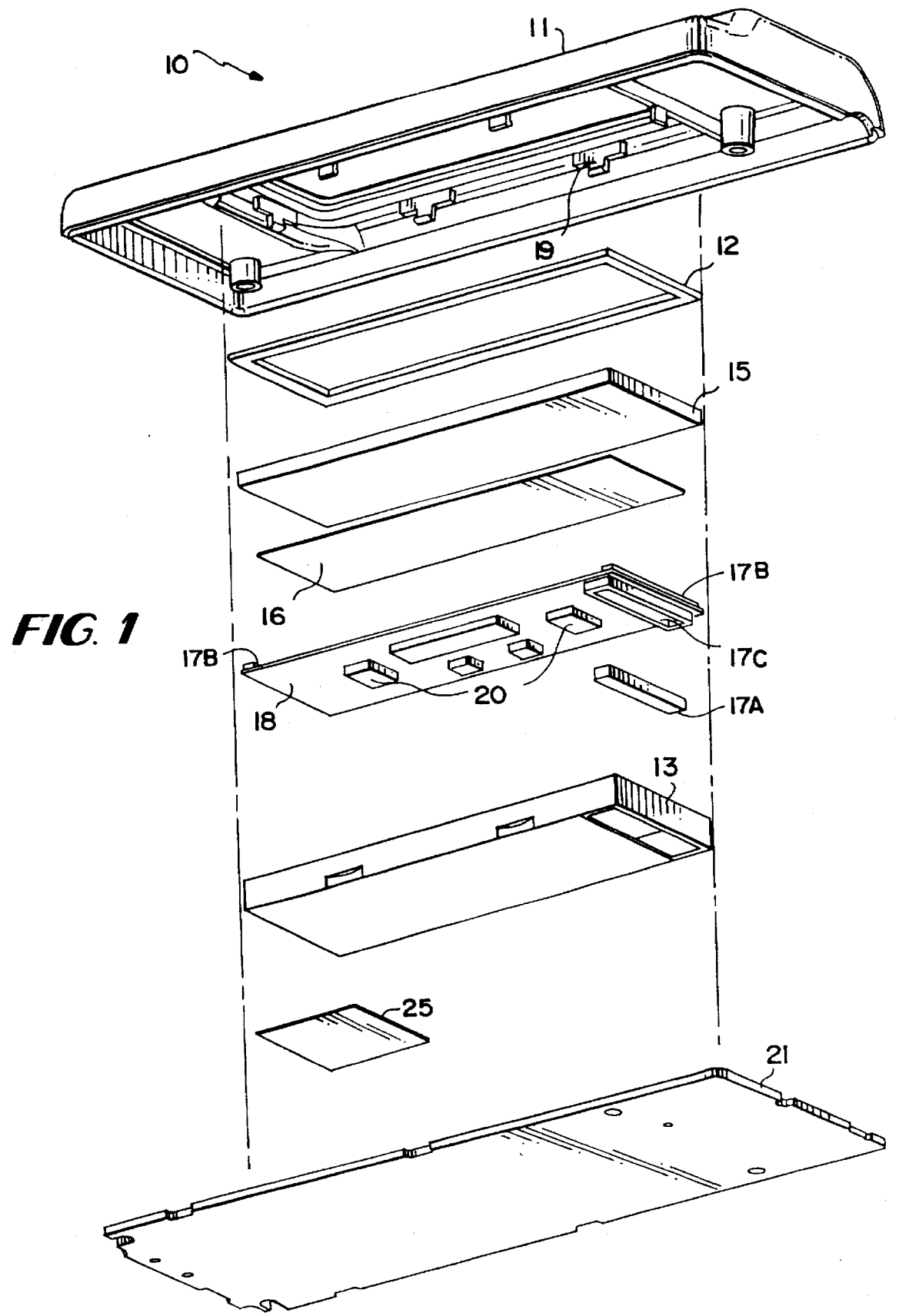
FIG. 1 is an exploded perspective view of an example embodiment of the present invention.
Figure 2:
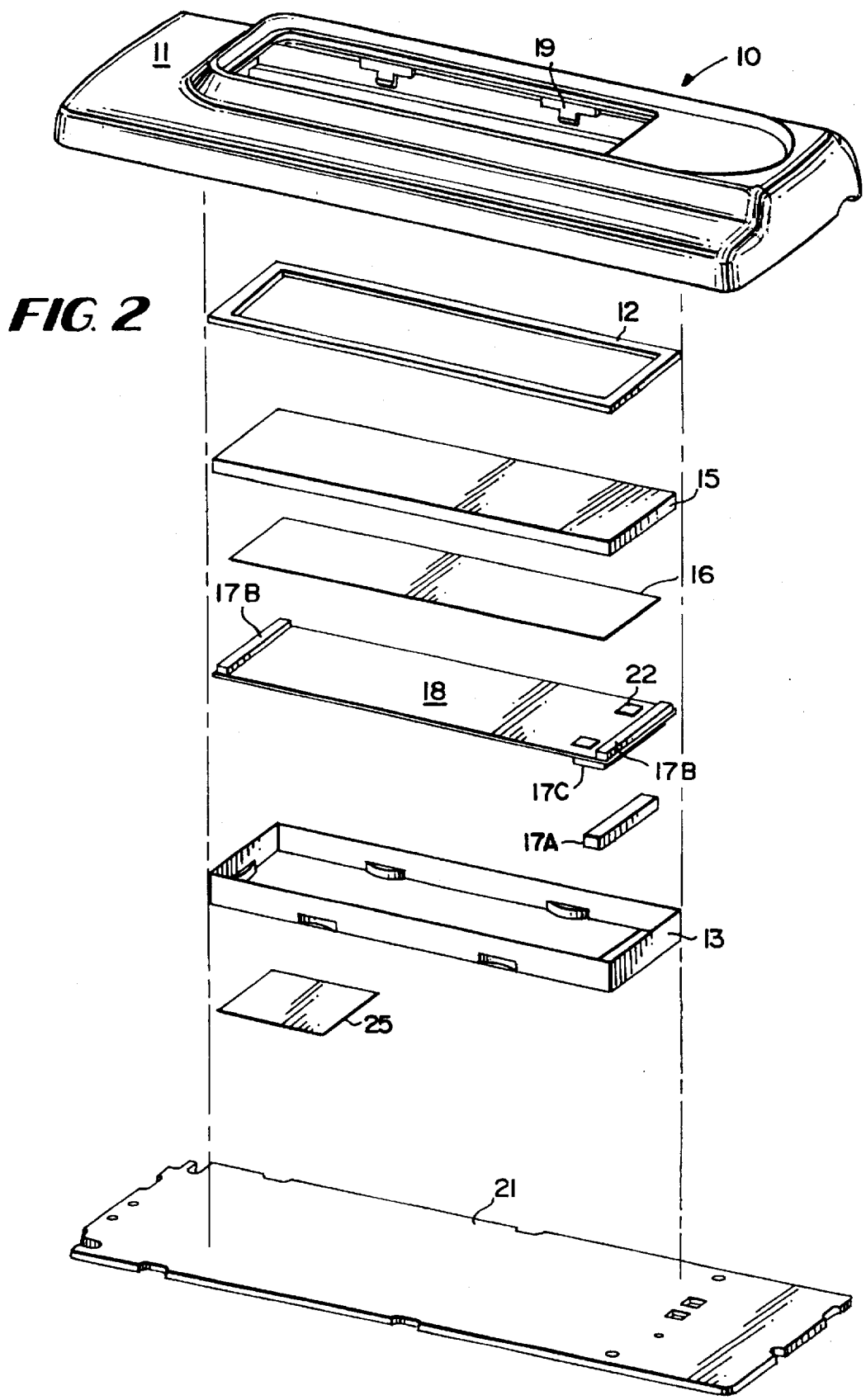
FIG. 2 is another exploded perspective view of the embodiment of FIG. 1.

An example embodiment of an LCD application 10 employing the present invention is shown in FIGS. 1 and 2. The LCD assembly 10 includes a number of parts layered one upon another. A front cover 11 is made of plastic or metal and houses within it a gasket 12, a frame 13 in contact with the gasket 12 sandwiches an LCD material 15, an electroluminescent lighting material 16 behind the LCD material 15, and an electronic board 18. The assembly snaps into six snaps 19 in the front cover 11 and then the board 21 is screwed to the front cover 11.

The operation of the LCD material 15 and the electroluminescent material 16 are generally known to require appropriate electronic drivers 20, which are located on the electronics board 18. Traditionally, the drivers 20 were electrically connected to the LCD material 15 and electroluminescent material 16 by solder or jumpers. Unfortunately, during assembly, using solders or jumpers to make these electrical connections requires intricate skill to coordinate the electrical connection of the drivers 20 to the LCD 15 and electroluminescent material 16 at the same time the board 18 is being physically assembled with the LCD 15 and electroluminescent material 16 in the frame 13 and front cover 11.

To solve this problem, the present invention uses elastomeric connectors 17B made of compressible silicone conductive strips to make contact with the LCD 15 as the board 18 is placed into the frame 13. The use of compressible silicone conductive strips for these connections eliminates soldering, and is reliable down to 0.05Ω contact resistance. In addition, the frame 13 is designed for maximum impact protection by closely enveloping the LCD 15, material 16, etc. Conductive tape 22 is used to make contact with the electroluminescent material 16 and the board 18.

In the embodiment of FIGS. 1 and 2, when the frame 13 is physically assembled into the front cover 11, it sandwiches the LCD 15, and electroluminescent material 16 between the board 18 such that, when the board 21 is screwed down to the front cover 11, the two elastomeric connectors 17B on the ends of board 18 are compressed, respectively, against the LCD 15 to make the necessary electrical connections. Material 16 is slightly shorter than LCD 15 to permit the elastomeric connectors 17B to bypass the material 16 and connect directly to the LCD 15.

During assembly, the frame 13 snaps into the snap 19 on the front cover 11. Then, board 21 is screwed to front 11 to secure the sandwich into one integral assembly. The frame 13 is optionally separated from the circuit board 21 by shock pad 25. The frame acts, in part, as a shield for the LCD 15, electroluminescent material 16, and board 18 from stray radio frequency signals.

Electroluminescent material 16 provides background lighting built right into the LCD assembly, thus eliminating any LED or lightguide requirements on the consumer product circuit board to which the LCD assembly ultimately attaches. The electroluminescent lighting drivers are mounted onto the board 18 next to the LCD drivers.

The elastomeric connectors are made of alternate layers of conductive and non-conductive silicone or, alternatively, of silicone wrapped with thin gold plated loops. These connections are commercially available from such known companies as Elastomeric Technologies and Ampaflex.

Board 18 is a standard printed circuit board that makes electrical connection between the drivers 20 and the elastomeric connector 17B such that the elastomeric connectors, when connected with the LCD 15, make the appropriate electrical connections between the drivers 20 and the LCD 15. In this way, the drivers 20 control the operation of the LCD 15 in generally known fashion.

When the LCD assembly 10 is fully assembled and the board 18 is screwed down between the frame 13 and front cover 11, the exposed side of the board 18 (FIG. 1) contains another elastomeric connector 17A. This connector 17A in receptacle 17C electrically connects to the elastomeric connectors 17B and also electrically connects to the main circuit board 21 of the consumer product to which the LCD assembly 10 is operative. From the main circuit board, the elastomeric connector 17A receives power and control signals and delivers them to the drivers 20, the LCD material 15 and electroluminescent material 16. This assembly method and apparatus eliminates LED and light guide requirements on the main circuit board yet is easier to manufacture than prior assembly methods.

As can be seen from the assembly drawings of FIGS. 1 and 2, the LCD assembly 10 in accordance with this embodiment of the present invention can be rapidly assembled, with all electrical and physical connections made simply and easily in one step by screwing the frame 13 and board 18 to the front cover 11.

FIGS. 3-6 show an additional embodiment of the present invention. FIGS. 3 and 4 are exploded perspective views of the embodiment described and shown in FIGS. 3-6. FIGS. 3 and 4 are views of the LCD module 110, with FIG. 3 viewed from the top and FIG. 4 viewed from the bottom. In addition, FIG. 4 is rotated 180° compared to FIG. 3.

In the embodiment of FIGS. 3 and 4, frame 113 is in the form of a metal tray, within which the LCD 115, electroluminescent material 116, board 118, and elastomeric connector material 117A are layered. The elastomeric connector 117A extends from the frame 113 through openings 141 to contact the main circuit board of the consumer product to which the LCD assembly 110 is to be used.

An optional spacer and shockpad 160 may be used to space the main printed circuit board of the consumer product from the frame 113 at an end of the frame 113 opposite the elastomeric connector 117A.

As shown in FIG. 4, printed circuit board 118 includes LCD drivers 151 and electroluminescent material drivers and support chips 150.

As in the embodiment of FIGS. 1 and 2, the embodiment of FIGS. 3 and 4 includes electroluminescent material 116 to backlight the LCD 115. Board 118 includes all drivers and other circuitry required to operate the electroluminescent panel 116 and LCD 115. Electrical connections can be made from board 118 to electroluminescent panel 116 and LCD 115 by additional elastomeric connectors (not shown) such as described with respect to FIGS. 1 and 2, or alternatively can be provided by flexible ribbon.

Other than the as shown differences in the Figures, the embodiment of FIGS. 3 and 4 is functionally similar to the embodiment of FIGS. 1 and 2.

FIG. 5 is an orthogonal view of an LCD 115, electroluminescent material 116, elastomeric connector 117A, board 118, and frame 113. As shown in FIG. 5, the LCD material 115 lays on top of the electroluminescent material 116, which in turns lays on top of the board 118. Frame 113 surrounds these materials and holds them in place within its protective metal surrounding. The elastomeric connector 117A is held in a receptacle 117B on the board 118, as shown in FIG. 6. FIG. 6 is a detailed cutaway of the right-portion of the structure shown in FIG. 5. As shown in FIG. 6, the elastomeric connector 117A extends from the board 118 and faces outward from the assembly 110 (compare to FIG. 1) to connect to the main circuit board (not shown) of the consumer product to which the LCD assembly 110 is used. A punch tab 140, which is part of the frame 113, supports the board 118 on the main circuit board of the consumer product and snaps the LCD into the front cover. With reference to FIG. 3, the front cover 11 (not shown) would attach at the top of the exploded view to sandwich materials 115, 116, and board 118 into frame 113.

In the presently preferred embodiment, the frame 113 is composed of nickel-silver. The electroluminescent material 116 is a strip of approximately 0.3 mm thickness. The elastomeric connectors are layered conductive and non-conductive silicone with a 10–20% compression and a contact resistance of 0.05Ω.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An LCD assembly for connection to a main circuit board, comprising:

a frame, and an LCD material layered on an electroluminescent material layered on a driver circuit board, all within the frame, said driver circuit board having two sides, one side having a main elastomeric conductive strip electrically connecting the main circuit board, and the other side having two additional elastomeric conductive strips electrically connected, respectively, to said LCD material.

2. An LCD assembly according to claim 1, wherein said frame surrounds said LCD material, electroluminescent material and said driver circuit board.

3. An LCD assembly according to claim 2, wherein said frame shields said LCD material, said electroluminescent material and said driver circuit board from RF signals.

4. An LCD assembly according to claim 1, wherein said electroluminescent material is shorter in length than said LCD material so said additional conductive strips bypass said electroluminescent material to electrically connect said LCD material.

5. An LCD assembly according to claim 1, further including a front cover attached to said frame.

6. An LCD assembly wherein said frame is tray-shaped.

7. An LCD assembly according to claim 1, further including a front cover attached to said frame.

8. An LCD assembly according to claim 1 wherein the main circuit board forms part of a consumer product and the front cover includes attachers for physically attaching the front cover to the consumer product.

9. An LCD assembly for a product having a product circuit board comprising:

a frame, and an LCD material layered on an electroluminescent material layered on a driver circuit board, all within the frame, said driver circuit board having two sides, one side having an elastomeric conductive strip at least partially connecting the product circuit board of the product, and the other side having an electrically conductive connection from said driver circuit board to said LCD material and said electroluminescent material.

10. An LCD assembly according to claim 9, wherein said frame surrounds said LCD material, electroluminescent material and said driver circuit board.

11. An LCD assembly according to claim 8, wherein said frame shields said LCD material, said electroluminescent material and said driver circuit board from RF signals.

12. An LCD assembly according to claim 9, further including drivers on said circuit board electrically connected to said LCD material and said electroluminescent material.

* * * * *

UNITED STATES PATENT AND TRADEMARK OFFICE
CERTIFICATE OF CORRECTION

PATENT NO. : 5,748,270
DATED : May 5, 1998
INVENTOR(S) : Smith, Dwight D.

It is certified that error appears in the above-identified patent and that said letters patent is hereby corrected as shown below:

Column 6, line 43, change "8" to --10--.

Signed and Sealed this

Twenty-second Day of September, 1998

*Attest:*

BRUCE LEHMAN

*Attesting Officer*                    *Commissioner of Patents and Trademarks*